May 29, 1928.
J. E. CHASE
BATTERY CARRIER
Filed Feb. 23, 1927
1,671,812
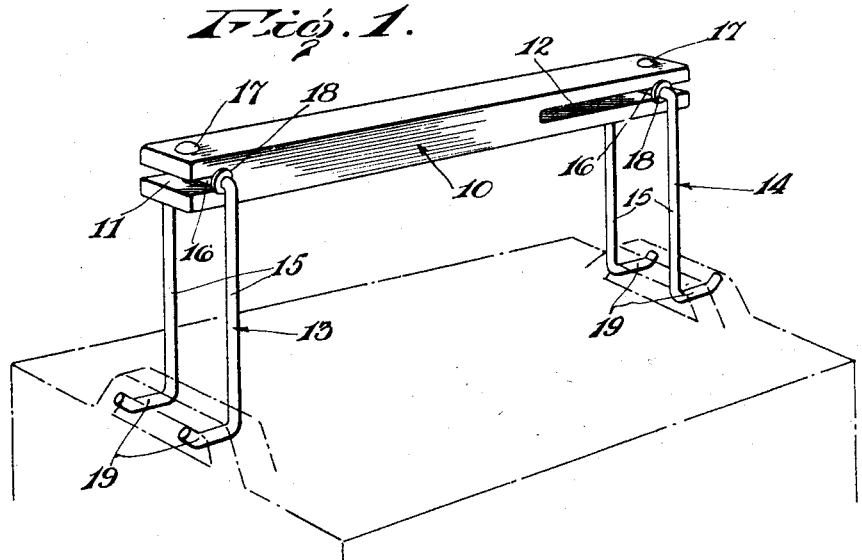
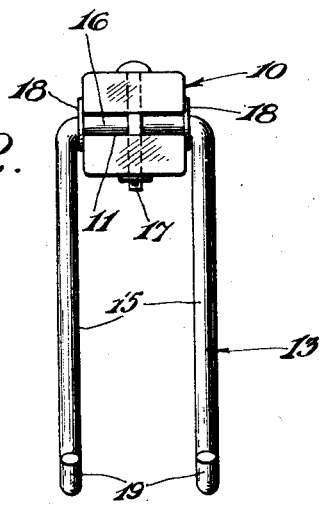
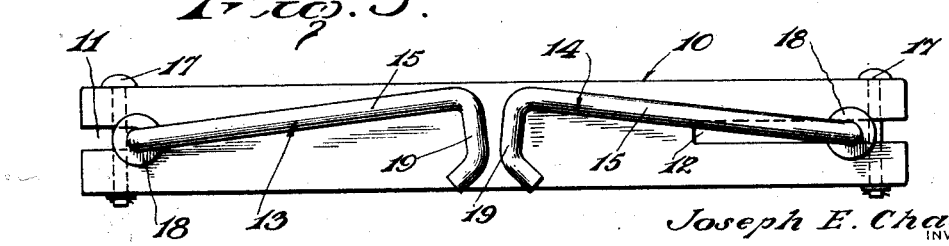
Joseph E. Chase
INVENTOR Patented May 29, 1928.

1,671,812

UNITED STATES PATENT OFFICE.

JOSEPH EDWIN CHASE, OF SCHENECTADY, NEW YORK.

BATTERY CARRIER.

Application filed February 23, 1927. Serial No. 170,339.

This invention relates to improvements in battery carriers.

The primary object of the invention resides in a battery carrier for facilitating the easy carrying of batteries, as it will be appreciated that the same are usually constructed with a pair of opposed hand or finger grips which renders them awkward to carry.

Another object of the invention is to provide a battery carrier which is adjustable to accommodate the carrying of different size batteries.

A further object of the invention is the provision of a battery carrier which includes a handle member having a pair of hook members pivoted thereto and which are foldable against the handle member when not in use to produce a compact structure.

A still further object is to provide a battery carrier which is simple in construction, inexpensive of manufacture and strong and durable for the purpose intended.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of my improved battery carrier.

Figure 2 is an end elevation of the same.

Figure 3 is a side elevation with the hook members in a folded position.

Referring more particularly to the drawing, the reference numeral 10 designates a handle member or grip which is preferably constructed of hard wood and is substantially square in cross section, the same having its opposed ends slotted inwardly as at 11 and 12 respectively. The slot 12 is longer than the slot 11 for a purpose to be presently explained.

Mounted in the slots 11 and 12 are hook members 13 and 14 respectively, which are identical in construction and are each formed of a single length of heavy steel wire, or the like. Each hook member is of inverted U-shape and includes parallel legs 15 and a connecting bight portion 16. The bight portion of each member is journalled in a respective slot and is prevented from pulling through the open end of the slots by a rivet or bolt 17 which passes vertically through the ends of the handle member 10. The bight portions of the hook members are provided with washers 18 which abut the side faces of the handle member and prevent the upper portions of the legs from scraping against the handle member when they are swung to an inoperative position.

The ends of the legs 15 are bent outwardly into hooks 19 for reception in the hand holes provided in the battery to be carried.

The hook member 14 is slidable longitudinally in the slot 12 so as to be adjusted toward or away from the hook member 13 whereby the carrier may be adjusted for attachment to batteries of different lengths. The person carrying the battery may grip the handle member 10 from which the battery is suspended by engaging the hooks 19 with the hand grips of the battery.

When not in use, the hook members 13 and 14 are swung inwardly to lie parallel with the side walls of the handle member as shown in Figure 3 of the drawing to provide a neat and compact device.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A battery carrier comprising an elongnated handle member having slots extending inwardly from the ends thereof, U-shaped members having their bight portions seated within said slots, elements passing through the ends of said handle member for preventing said U-shaped members from pulling out of said slots, and hooks provided on the free ends of said U-shaped members.

In testimony whereof I have affixed my signature.

JOSEPH EDWIN CHASE.